Patented Oct. 9, 1923.

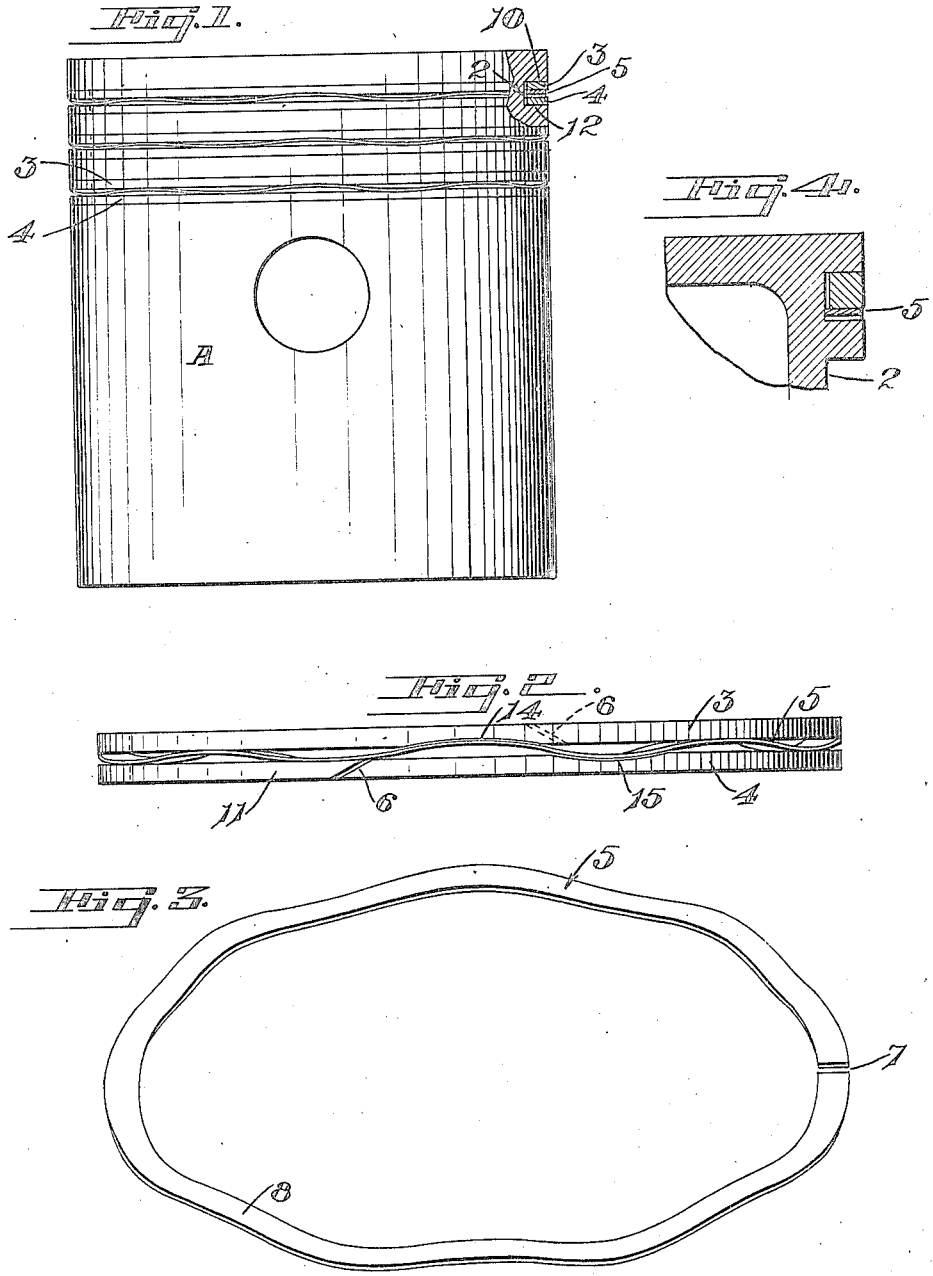

1,470,263

UNITED STATES PATENT OFFICE.

WILLIAM R. HESLEWOOD AND HARRY F. MOCINE, OF OAKLAND, CALIFORNIA, ASSIGNORS TO HARRY F. MOCINE, WILLIAM R. HESLEWOOD, GEORGE J. CARR, AND E. B. KIMBALL, TRUSTEES OF THE M. AND H. PISTON RING COMPANY.

PISTON RING.

Application filed May 18, 1921. Serial No. 470,511.

*To all whom it may concern:*

Be it known that we, WILLIAM R. HESLEWOOD and HARRY F. MOCINE, citizens of the United States, residing at Oakland, in the county of Alameda and State of California, have invented new and useful Improvements in Piston Rings, of which the following is a specification.

This invention relates to a piston ring, and particularly to that type known as multiple piece or leak-proof rings.

One of the objects of the present invention is to provide a simple, substantial and cheaply manufactured piston ring especially adapted for pistons such as employed in internal combustion engines and the like, and particularly a piston ring which will not only reduce leakage to a minimum, but which will also, practically speaking, stop all transfer of lubricating oil from the crank case to the combustion chamber.

Another object of the invention is to provide a piston ring consisting of two independent rings placed one above the other and interspaced; said rings being split to permit circumferential expansion and having a spring expansion ring placed between the same so as to maintain snug engagement with the upper and lower walls of the piston groove.

Another object of the invention is to provide means for locking the superposed rings and the expansion ring against turning movement with relation to each other.

Further objects will hereinafter appear.

The invention consists of the parts and the construction, combination and arrangement of parts as hereinafter more fully described and claimed, having reference to the accompanying drawings, in which—

Fig. 1 is a side elevation of a piston partially in section showing the application of the invention.

Fig. 2 is a side elevation of a complete piston ring assembly.

Fig. 3 is a perspective view of the spring expansion ring.

Fig. 4 is a detail sectional view of a piston showing an ordinary piston ring employed in conjunction with the spring expansion ring.

Referring to the drawings in detail, A indicates a standard form of piston, and 2 the piston ring grooves formed therein.

The piston ring forming the subject matter of the present invention consists of two separated rings such as indicated at 3 and 4. These rings are placed one above the other and are interspaced by means of a spring expansion ring such as indicated at 5. By referring to Fig. 2, it will be seen that a piston ring assembly consists of two superposed rings 3 and 4, and a spacing or expansion member, to-wit, the spring expansion ring 5 which is placed between the same; a set of rings so assembled being placed in each piston ring groove. The rings 3 and 4 are identical in construction, each ring being flat and split as at 6 to permit circumferential expansion. The spring expansion ring interposed between the ring sections 3 and 4 is preferably constructed of flat steel wire such as shown in Fig. 3, and is also split as at 7 to permit circumferential expansion. It is furthermore pressed or bent to form a wave-like or corrugated surface 8 to exert an upward pressure on the ring 3, and a downward pressure on the ring 4 when placed between the same, This is an important feature of the present invention as it maintains the upper surface 9 of the ring 3 in close contact with the upper wall 10 of the piston groove, and similarly the lower face 11 of the ring 4 in close contact with the lower wall 12 of the piston groove; gas or oil leakage around the rings being in this manner, practically speaking, eliminated.

In actual practice we have found that single piece piston rings, such as ordinarily employed, have a tendency to wear not only on their outer surface which contacts with the cylinder wall, but also on their lower and upper faces which contact with the upper and lower walls 10 and 12 of the piston groove. The latter wear is caused by the reciprocal movement of the piston, that is the piston rings tend to drag to a more or less extent and they therefore snugly engage the upper wall of the piston groove when the piston is travelling downwardly, and conversely the lower wall of the piston groove when the piston is travelling upwardly. A slight reciprocal movement is thus transmitted which gradually increases as wear takes place. We have further found that the moment any play of the character described begins to take place, a slight pumping action is created in each piston ring groove, and that oil is transferred upwardly around the rings, due to this pumping action; this oil being finally transferred to the combustion chamber of the engine where it causes trouble by fouling the plugs and by forming carbon, etc. Such oil leakage is, practically speaking, entirely overcome in the present instance as each section of the present ring here shown is always maintained in snug engagement with the respective walls of the piston groove, regardless of the movement of the piston. Gas leakage is similarly reduced and greater efficiency, power output, etc., is obtained from an engine; a marked saving in lubricating oil being at the same time noticed.

In actual practice we have found that the utility of the spring expansion ring shown in Fig. 3 is not limited to a multiple ring such as shown in the present instance, and has been successfully employed in conjunction with the standard form of solid ring, such as illustrated in Fig. 4. In that instance it is preferable to place the expansion ring between the lower face of the ring and the lower wall of the piston groove as shown. The placing of the ring 5 maintains the upper face of the ring in snug engagement with the upper wall of the piston groove and thereby eliminates any reciprocal movement or pumping action which might cause a transfer of oil. It naturally also reduces gas or compression leakage to a minimum. The ring 5, as previously stated, is split, as at 7, and it may therefore be readily applied, whether placed below a single ring, such as shown in Fig. 4, or between a pair of rings where multiple rings are employed as shown in Figs. 1 and 2, and as the ring is constructed of spring steel and has considerable width or surface, it is obvious that exceedingly thin material may be employed without in any way destroying its efficiency as an expansion ring.

For the purpose of securing the rings 3 and 4 against turning movement with relation to each other, and with relation to the expansion ring 5, we have provided recesses, such as shown at 14 and 15. The recess 14 is formed in the lower face of the ring 3, and conversely the recess 15 in the upper face of the ring 4. These recesses are engaged by the wave or corrugated portions of the ring 5 and the rings are thus secured against turning movement with relation to each other. This is of considerable importance as it permits the split sides of the rings, such as indicated at 6, to be placed in opposition with relation to each other, thereby reducing leakage through the split portions to a minimum.

Having thus described our invention, what we claim and desire to secure by Letters Patent is—

A piston ring of the character described comprising a pair of superposed circumferentially expansible split rings, an expansion ring interposed between the same, said expansion ring being flat in cross section and constructed of thin spring steel and split to permit circumferential expansion, and also having a corrugated or wave like surface formed to permit vertical expension, and a pair of recesses formed in the adjacent faces of the first named rings, one recess in each ring to receive opposed corrugated portions of the interposed ring and to prevent turning movement of the several rings.

WILLIAM R. HESLEWOOD.
HARRY F. MOCINE.